Jan. 19, 1932.   N. W. DALTON   1,841,880
WATERING SYSTEM FOR LIVE STOCK
Filed Jan. 26, 1929
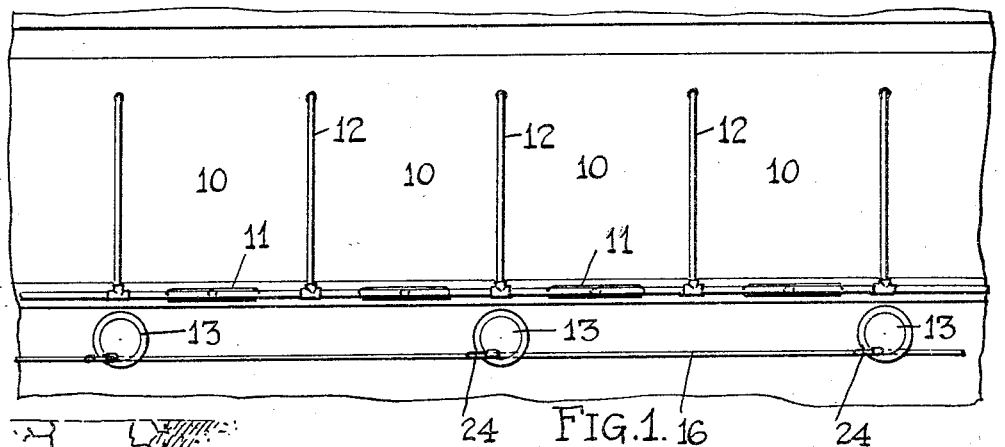
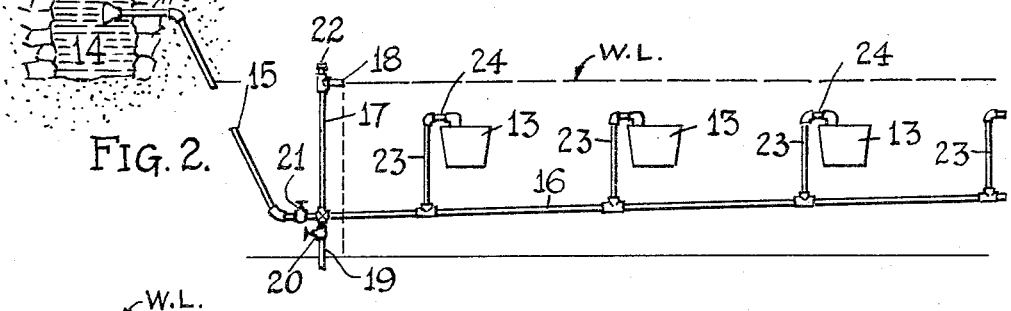
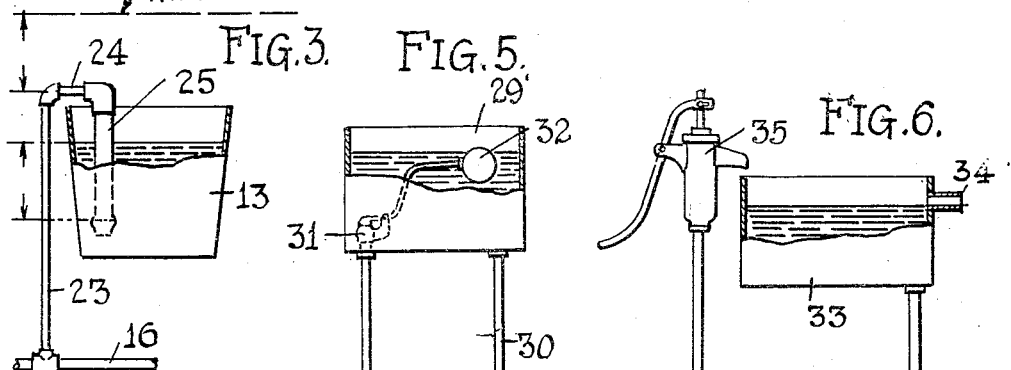
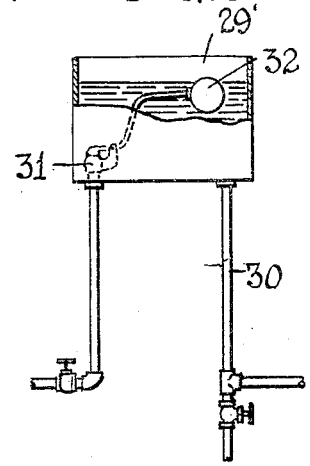
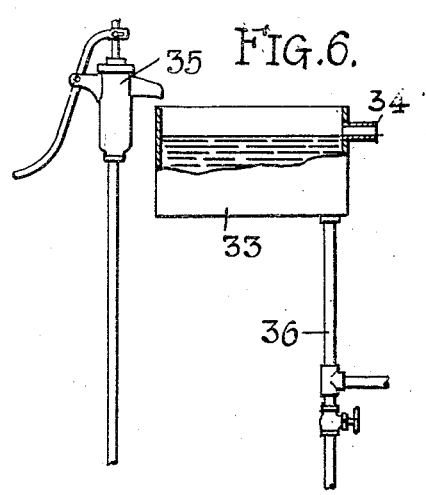
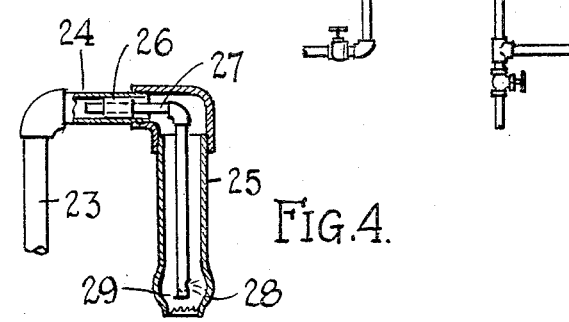
INVENTOR
NELSON W. DALTON.
BY
ATTORNEY Patented Jan. 19, 1932

1,841,880

UNITED STATES PATENT OFFICE

NELSON W. DALTON, OF BATH, NEW YORK

WATERING SYSTEM FOR LIVE STOCK

Application filed January 26, 1929. Serial No. 335,164.

My invention relates to watering systems for live stock and more particularly to a hydrostatic watering system for stabled and/or stanchioned cows.

In order to produce a mamimum flow of milk from dairy cows, it is necessary to provide ample drinking water for them at all times when confined to the stable or barn. Two systems of watering live stock are now generally used, i. e., the "gravity system" and the "automatic system", so-called. In the gravity system the drinking cups or receptacles are carefully leveled and are at all times in open communication with a source of water supply. By providing a supply tank in which the water is kept at a predetermined level, gravity keeps the water in the drinking cups at this same or predetermined level at all times. In the automatic system the water is supplied under pressure. To regulate the water supply to the drinking cups, each cup is equipped with a suitable automatic valve which the cows operate when drinking. In this way the water supply to the drinking cups is periodically replenished automatically.

Each of said two systems, tho seemingly satisfactory, have certain inherent defects and disadvantages. In the gravity system the water flow is too slow due to the low head of water, and the drinking cups, often fouled, are difficult to keep clean and sanitary. In the automatic system, the pressure required to be maintained is considerable; the system is expensive to install and maintain; the automatic valves become clogged and leaky; and not infrequently flooding occurs, due to the improper functioning of the one or more automatic valves. Both systems moreover, in freezing weather, are seriously defective in that neither can be quickly and easily drained.

As distinguished from the foregoing, my improved or hydrostatic stock watering system is designed to overcome the disadvantages and defects hereinabove set forth. In freezing weather my improved stock watering system can be quickly and completely drained by merely opening a valve. The drinking cups can be quickly and easily cleaned at any and all times. Each cow is at all times assured of a liberal supply of drinking water. The drinking cups can, under no circumstances, overflow and flood the stable or barn. And last, but not least, a goodly supply of water is always available in the event of fire.

In the drawings, wherein like reference characters denote like or corresponding parts, Fig. 1 is a plan view of a series of cow stalls showing the preferred arrangement of the drinking cups (preferably one drinking cup for each two stalls);

Fig. 2 is a semi-diagrammatic view of the watering system where a spring or flowing stream constitutes the source of water supply;

Fig. 3 is a detail view of the upper end of the pipe line showing the relative arrangement of the various levels required to be established and maintained;

Fig. 4 is an enlarged fragmentary sectional view of a portion of the pipe line;

Fig. 5 is a side elevation of a modified means of establishing and maintaining a water main level where the water is supplied to the water main under pressure, and Fig. 6 is a side elevation of a further modified means of establishing and maintaining a water main level where the water is supplied to the water main from a supply tank into which the water is pumped.

In the embodiment of the invention selected for illustration, a series of stalls 10, stanchions 11, partitions 12, and drinking cups 13 are shown. For each two stalls, one drinking cup 13 is provided. Preferably the drinking cups are fastened to the stanchion frame by suitable brackets (not shown).

In Fig. 2 a flowing spring or stream of water is indicated at 14. From this source of water supply a pipe 15 leads to and is in open communication with a water main 16 from which the water necessary to the filling of the drinking cups or receptacles 13 is drawn. As the flow of water from the spring or stream of water 14 is more or less constant, and as such source of water supply is preferably at an elevation above the water level desired to be maintained in said drinking cups, a stand pipe 17 having an overflow 18 is provided. The level of said overflow, designated W. L. in Figs. 2 and 3, and its relationship to the water level desired to be maintained in said drinking cups, will be more fully hereinafter explained. Suffice it to say that the height of the overflow, and hence the water level W. L. determines the hydrostatic head on the water supplied to the drinking cups 13 thru the water main. As indicated in said Fig. 2 the water main 16 preferably slopes toward a low point to admit of the rapid draining thereof when complete drainage of the watering system is required.

For the purpose of controlling the drainage of the system a drain pipe 19 and a valve 20 are provided at a low point in said system. By shutting off the water supply to the water main 16, as by means of a valve 21, and opening the drain valve 20, the system can be quickly and completely drained in cold weather, or, if desired, when it is desired to clean the drinking cups 13. Also, if desired, a valve 22 may be provided to shut off the overflow at 18, in which case, an increased head of water in the water main may be established. In case of fire such increased water pressure might very conceivably be desired.

In Fig. 3 one of the feed lines extending between the water main 16 and one of the drinking cups 13 is clearly illustrated. From the water main 16 the water is piped thru a riser 23 to a nipple 24 and thence down a drop-leg 25 into the drinking cup 13 at a point nearer to the bottom thereof than to the top. The height of the water level at the overflow 18 above the top of the riser 23 (the high point in the feed line) is the hydrostatic head which induces the water flow into the drinking cups 13. The riser 23 and nipple 24 are preferably smaller in diameter than the diameter of the drop-leg 25. As the water flows from the several feed lines into the drinking cups 13 the lower end of each drop-leg 25 is sealed and a certain amount of air trapped therein. As the water rises in the drinking cups, its rise in the drop-legs 25 is stopped on account of the air trapped therein. The water in the drinking cups, therefore, exerts a pressure on the air thus trapped in the drop-legs. This pressure is directly proportional to the difference in the level of the surface of the water in the drinking cups and the surface of the water inside the drop-legs 25. As soon as this difference in level is equal to the hydrostatic head, the end of the riser is sealed against such pressure and the water can no longer flow up the riser and thence into the drinking cups. Hence the drinking cups cannot overflow. Such well known phenomenon is commonly designated an "air lock". If we assume, therefore, that a cow starts to drink water from any given cup, the pressure on the air in the drop-leg serving such cup diminishes as the water is lowered in said cup and the riser is no longer sealed against the hydrostatic head. Water will then flow into the drinking cup and continue to flow until the predetermined water level for such cup is re-established. A liberal supply of drinking water in each and all of the drinking cups is thus automatically maintained and controlled.

While the above system, in theory at least, is perfectly satisfactory, there are certain conditions encountered in actual practice wherein the air lock might very conceivably break down. Such break-down might very conceivably occur should any substantial portion of the air in the drop-leg be removed. As it is a well known fact that falling water will ofttimes carry with it a certain amount of air, such air escape from the drop-leg might readily occur. If, therefore, water is allowed to flow into the empty drinking cup under the established hydrostatic head, a considerable quantity of water will fall down the drop-leg and, as intimated, may very conceivably carry with it a portion of the air. Should this occur, the fact will be indicated to an observer by air bubbles issuing out of the immersed end of the drop-leg and rising to the surface of the water in the drinking cup.

To prevent the above occurrence, and to assure operation of the watering system under all conditions of service, it may be found necessary to provide in the one or more drop-legs suitable baffles so that the air carried by the falling water when it separates therefrom will rise inside the drop-leg instead of escaping from the lower end thereof as previously described. In Fig. 4 an arrangement to take care of this situation is illustrated. In said figure the horizontal nipple 24 is provided on its inside with a plug 26 (preferably of non-corrosive metal such as lead), and loosely fitting in this plug is a pipe 27 which extends nearly to the bottom of the drop-leg 25. As a further assurance toward the retention of the air within the drop-leg the outlet 28 for such pipe 27 is formed at one side thereof in order that the direct flow of the water may be broken at the discharge point. Also, if desired, a screen 29 may be provided at the outlet end of the drop-leg 25. Thus constructed, it is at once apparent that having changed the direction of the flow of water and having thus reduced its velocity of flow, the water will flow quietly out thru the screened opening and rise in the drinking cup without carrying any harmful amount of air with it; the air and water being separated within the drop-leg, and the air retained therein.

Such a system of baffling as herein described will cause the air lock to be established under all conditions of use and will, therefore, prevent the drinking cups from overflowing. I do not, however, in this application, limit myself to the particular system of baffling shown. Other systems or arrangements tending to separate the air and water to prevent the escape of the air necessary to the creation of the air lock may be used instead.

It is further evident that the source of water supply indicated in Fig. 2 is not the only source of water supply under which the watering system will operate. It is evident from an examination of the details of the operation of the stoppage of the water flow by the air lock that the only absolute essential to the supply of water from any favorable source of water supply is that a predetermined hydrostatic head be maintained. Such hydrostatic head (see Fig. 3) is at all times governed by the distance that the water level W. L. is above the top of the riser 23. This distance, in every instance, will correspond with the distance between the point of communication between the feed pipe and the drinking cup and the intended or proper predetermined level of the water in said cup.

If the water supply is not simply brought to the stable or barn from a stream or spring as indicated in Fig. 2, but is brought to the barn under considerable pressure, as is sometimes the case, where a pressure system is available, and where it is further necessary that the water be not wasted thru the overflow at 18, such conditions may be easily met by an arrangement such as that indicated in Fig. 5. As indicated in said figure a tank 29 is provided from which the water is fed by gravity thru a pipe 30 to the barn or water main. The water in this tank is piped in thru a valve 31 which is operated or controlled by a float 32 in the tank so that when the water level in the tank drops due to the flow of water to the drinking cups, the float will open the valve and when the surface of the water arises to the height desired and according to the water level desired to be maintained, the float 32 will again close said valve. Such an arrangement of water control may be properly designated a "ballcock". Its operation is exactly the same as that shown in Fig. 2 except that there is no waste of water.

Should there be no flowing water available, my improved hydrostatic system can, nevertheless, be made to operate where either the gravity system or the tank system would be inoperative. To illustrate we will assume that the water supply is below the necessary hydrostatic head or water level indicated at W. L. As illustrated in Fig. 6 a tank 33 is provided, such tank having an overflow 34 at the water level desired to be maintained. A pump 35 is also provided for drawing water from a lower level and pumping it into the tank 33 from whence it is fed by a pipe 36 to the barn or water main. The fact that the tank is full of water or that water is spilling from the overflow 34 will indicate to the operator that the drinking cups have all been properly filled. While under the latter system, or rather condition, the watering system is not automatic, and must be operated at suitable intervals, nevertheless the results obtained by such a supervised system are in every way comparable to the automatic. The only difference is that in the automatic system no labor is required to be expended to maintain the water level W. L., whereas in the arrangement of Fig. 6, it is necessary to pump the water from a lower level into the tank 33.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a watering system, a drinking receptacle, a source of water supply at an elevation above the predetermined water level which it is desired to maintain in said receptacle, a pipe line leading off from said water supply and discharging into said receptacle at a point below said predetermined water level, and means for maintaining in said pipe line a hydrostatic head sufficient to prevent the rise of water in said receptacle beyond said predetermined level.

2. In a watering system, a drinking receptacle, a source of water supply at an elevation above the predetermined water level which it is desired to maintain in said receptacle, and a pipe line leading off from said water supply and discharging into said receptacle at a point in the vicinity of the bottom thereof, said pipe line from said point of discharge being carried upwardly a measured distance substantially greater than the measured distance between said water level and the high point in said pipe line.

3. In a watering system, a drinking receptacle, a source of water supply at an elevation above the predetermined water level which it is desired to maintain in said receptacle, a water main open to said source of water supply, a pipe line leading off from said water main and discharging into said receptacle at a point below said predetermined water level, and means for maintaining in said pipe line a hydrostatic head sufficient to prevent the rise of water in said receptacle beyond said predetermined level notwithstanding the fact that said predetermined level is substantially below said source of water supply.

4. In a watering system, a drinking receptacle, a source of water supply at an elevation above the predetermined water level which it is desired to maintain in said receptacle, a water main open to said source of water supply, means for maintaining in said water main a water level higher than the water level which it is desired to maintain in said receptacle, and a pipe line leading off from said water main and discharging into said receptacle at a point below the predetermined water level for said receptacle, the measured distance between said last mentioned water level and said point of discharge being substantially equal to the measured distance between said first mentioned water level and the high point in said pipe line.

5. In a watering system, a drinking receptacle, a source of water supply at an elevation above the predetermined water level which it is desired to maintain in said receptacle, a water main open to said source of water supply, means for maintaining in said water main a water level higher than the water level which it is desired to maintain in said receptacle, and a pipe line leading off from said water main and discharging into said receptacle at a point well below the predetermined water level thereof, said last mentioned water level being spaced above said point of discharge a measured distance substantially equal to the measured distance between the water main water level and the high point in said pipe line.

6. In a watering system, a drinking receptacle, a source of water supply at an elevation above the predetermined water level which it is desired to maintain in said receptacle, a water main open to said source of water supply, means for maintaining in said water main a predetermined water level above the level of the top of said receptacle, and a pipe line leading off from said water main and discharging into said receptacle in the vicinity of the bottom thereof, said pipe line from said point of discharge being carried upwardly a given distance directly proportional to the distance between the high point in said pipe line and the water level of the water main.

7. In a watering system, a drinking receptacle, a source of water supply at an elevation above the predetermined water level which it is desired to maintain in said receptacle, a water main open to said source of water supply, and a pipe line leading off from said water main and discharging into said receptacle, said pipe line intermediately of its ends being shaped to provide an air trap by means of which the flow of water to said receptacle is automatically shut off when said predetermined water level shall have been reached.

8. In a watering system, a drinking receptacle, a source of water supply at an elevation above the predetermined water level which it is desired to maintain in said receptacle, a water main open to said source of water supply, a pipe line leading off from said water main and discharging into said receptacle, said pipe line intermediately of its ends being shaped to provide an air trap by means of which the flow of water to said receptacle is automatically shut off when said predetermined water level shall have been reached, and means for preventing the escape of air from said pipe line during the water discharge therefrom.

9. In a watering system, a drinking receptacle, a source of water supply at an elevation above the predetermined water level which it is desired to maintain in said receptacle, a water main open to said source of water supply, a pipe line leading off from said water main and discharging into said receptacle, said pipe line intermediately of its ends being shaped to provide an air trap by means of which the flow of water to said receptacle is automatically shut off when said predetermined water level shall have been reached, and means encasing the outlet end of said pipe line for preventing the escape of air from said pipe line during the water discharge therefrom.

10. In a watering system, a drinking receptacle in which a predetermined water level is to be maintained, a source of water supply at an elevation above said predetermined water level, means within the watering system for establishing and maintaining a predetermined hydrostatic head of water, and a pipe line leading from said water supply to said receptacle, said pipe line, intermediately of its ends, being shaped to admit of the formation therein of an air lock, which said air lock, in conjunction with the predetermined hydrostatic head of water, prevents the rise of water within said receptacle beyond said predetermined level.

In testimony whereof I hereunto affix my signature.

NELSON W. DALTON.